United States Patent
Kang

(10) Patent No.: US 9,734,710 B2
(45) Date of Patent: Aug. 15, 2017

(54) REAL-TIME TRANSPORTATION NETWORK TOPOLOGY CONTROL-COMBINED TRAFFIC FLOW CONTROL AND DYNAMIC ROUTE GUIDANCE SYSTEM USING IN-VEHICLE NAVIGATOR WITH BIDIRECTIONAL COMMUNICATION AND PARKING GUIDANCE AND RESERVATION SYSTEM USING THE SAME

(71) Applicant: KOREA UNIVERSITY RESEARCH AND BUSINESS FOUNDATION, Seoul (KR)

(72) Inventor: Chung Gu Kang, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 37 days.

(21) Appl. No.: 14/612,242

(22) Filed: Feb. 2, 2015

(65) Prior Publication Data

US 2015/0219463 A1 Aug. 6, 2015

(30) Foreign Application Priority Data

Feb. 4, 2014 (KR) ........................ 10-2014-0012414

(51) Int. Cl.
*G01C 21/34* (2006.01)
*G08G 1/07* (2006.01)
(Continued)

(52) U.S. Cl.
CPC ........... *G08G 1/07* (2013.01); *G01C 21/3492* (2013.01); *G01C 21/3691* (2013.01);
(Continued)

(58) Field of Classification Search
CPC ........... G01C 21/34; G08G 1/143; G08G 1/07
See application file for complete search history.

(56) References Cited

U.S. PATENT DOCUMENTS 5,442,702 A * 8/1995 van Ooijen ........ H04Q 11/0478
380/256
6,463,382 B1 * 10/2002 Bullock ........... G08G 1/096716
701/117

(Continued)

FOREIGN PATENT DOCUMENTS

CN EP 1653639 A1 * 5/2006 ........... H04Q 3/0025
EP 2667333 A1 * 11/2013 ........... G06Q 10/063

(Continued)

*Primary Examiner* — Tuan C. To
(74) *Attorney, Agent, or Firm* — East West Law Group; Heedong Chae

(57) ABSTRACT

Provided are a real-time traffic flow control and dynamic route guidance system, a parking guidance system using the same, and a method thereof capable of guiding a vehicle distribution and a transportation flow by collecting positional information, destination information, a vehicle moving speed, and the like from each vehicle in real time at one or a plurality of central centers by using an in-vehicle navigator with bidirectional communication and a GPS to dynamically calculate and provide an optimal route of an individual vehicle so as to make a flow of the entire transportation network smooth and perform a control for a transportation network structure through various kinds of traffic control devices installed on roads.

9 Claims, 8 Drawing Sheets

(51) Int. Cl.
*G08G 1/14* (2006.01)
*G01C 21/36* (2006.01)
*G08G 1/0968* (2006.01)

(52) U.S. Cl.
CPC . *G08G 1/096811* (2013.01); *G08G 1/096844* (2013.01); *G08G 1/096855* (2013.01); *G08G 1/143* (2013.01)

(56) References Cited

U.S. PATENT DOCUMENTS

| | | | | |
|---|---|---|---|---|
| 9,087,453 | B2* | 7/2015 | Krivacic | G08G 1/14 |
| 9,178,716 | B2* | 11/2015 | Vaswani | G01D 4/004 |
| 9,330,565 | B2* | 5/2016 | Petty | G08G 1/0133 |
| 9,432,929 | B1* | 8/2016 | Ross | H04W 48/20 |
| 2003/0149919 | A1* | 8/2003 | Greenwald | G06F 11/2257 714/43 |
| 2008/0033640 | A1* | 2/2008 | Amano | G01C 21/3476 701/414 |
| 2009/0285097 | A1* | 11/2009 | So | H04Q 11/0062 370/235 |
| 2011/0068739 | A1* | 3/2011 | Smith | B60L 11/1844 320/109 |
| 2012/0056758 | A1* | 3/2012 | Kuhlman | G08G 1/14 340/932.2 |
| 2012/0109506 | A1* | 5/2012 | Fei | G08G 1/0116 701/118 |
| 2012/0290185 | A1* | 11/2012 | Cooper | B61L 27/0027 701/93 |
| 2013/0116916 | A1* | 5/2013 | Kickbusch | B61L 27/0016 701/118 |
| 2013/0151088 | A1* | 6/2013 | Ricci | G06F 17/00 701/51 |
| 2014/0067266 | A1* | 3/2014 | Berlingerio | G01C 21/3423 701/533 |
| 2014/0088865 | A1* | 3/2014 | Thies | G06Q 10/04 701/465 |
| 2015/0066545 | A1* | 3/2015 | Kotecha | G06Q 10/02 705/5 |
| 2015/0073689 | A1* | 3/2015 | Hampapur | G08G 1/0145 701/118 |
| 2015/0123818 | A1* | 5/2015 | Sellschopp | G01C 21/3484 340/932.2 |
| 2015/0197255 | A1* | 7/2015 | Friedrich | B61B 1/00 701/19 |

FOREIGN PATENT DOCUMENTS

| | | | | |
|---|---|---|---|---|
| FR | EP 2048830 A1 * | 4/2009 | | H04J 14/0227 |
| KR | 10-2004-0046946 | 5/2010 | | |
| KR | 10-2010-0064009 | 6/2010 | | |
| KR | 10-2011-0113579 | 10/2011 | | |

* cited by examiner

REAL-TIME TRANSPORTATION NETWORK TOPOLOGY CONTROL-COMBINED TRAFFIC FLOW CONTROL AND DYNAMIC ROUTE GUIDANCE SYSTEM USING IN-VEHICLE NAVIGATOR WITH BIDIRECTIONAL COMMUNICATION AND PARKING GUIDANCE AND RESERVATION SYSTEM USING THE SAME

CROSS-REFERENCE TO RELATED APPLICATION

This application claims the benefit of Korean Application No. 10-2014-0012414, filed on Feb. 4, 2014, with the Korean Intellectual Property Office, the disclosure of which is incorporated herein by reference.

BACKGROUND OF THE INVENTION

1. Field of the Invention

The present invention relates to a real-time traffic flow control and dynamic route guidance system, a parking guidance system using the same, and a method thereof capable of guiding a vehicle distribution and a transportation flow by collecting positional information, destination information, a vehicle moving speed, and the like from each vehicle in real time at one or a plurality of central centers by using an in-vehicle navigator with bidirectional communication and a GPS to dynamically calculate and provide an optimal route of an individual vehicle so as to make a flow of the entire transportation network smooth and perform a control for a transportation network structure through various kinds of traffic control devices installed on roads.

2. Description of the Related Art

In recent years, while there has been a trend that the volume of traffic has also increased with a rapid increase in the number of vehicles, the volume of traffic, an increase and extension of a basic traffic infrastructure such as a road for accommodating the volume of traffic has been relatively slow. Accordingly, there has been a problem that a traffic quality deteriorates and an effort to intelligently control traffic has been continued in order to solve the problem.

Among them, a technique which has been attempted in recent years includes intelligent transport systems (ITS). The ITS includes a mode in which a position transmitter is installed in a signal lamp or a street lamp and the position transmitter transmits information regarding passing of a vehicle to a central center by sensing a signal of a communication unit installed in the vehicle when the vehicle approaches the position transmitter. Thereafter, the central center is a technique that a traffic situation of a road through which the corresponding vehicle passes as traffic situation information by measuring a passage time and a speed based on information regarding the passing of the vehicle, which is collected by a plurality of position transmitters and thereafter, intelligently control the flow of the vehicle by controlling a traffic signal lamp according to the traffic situation information. However, in a collection mode of the traffic situation information through the mode, a separate infrastructure in which a separate position transmitter needs to be installed is required, and as a result, significant cost for constructing and managing the needed infrastructure is consumed.

Meanwhile, an in-vehicle navigator which has been recently mounted on various vehicles may track the position of the vehicle through a global positioning system (GPS) receiving unit and provides a corresponding route to a driver according to a specific condition when a destination is input.

In recent years, the in-vehicle navigator receives real-time traffic information from a central control device to guide a route to which the real-time traffic information in which traffic congestion is the smallest and the vehicle can reach the destination at a shortest time is reflected to a driver.

Meanwhile, the in-vehicle navigator having a bidirectional communication function provides information on the position, the speed, and the like of the vehicle to the central control device to be used even for real-time traffic information collection.

Further, when congestion of a road network is high, utilization of the road network can be maximized by controlling routes of individual vehicles so that vehicles are distributed according to a capacity of the road network by using positional information and speed information provided from the in-vehicle navigator having the bidirectional communication function. As a result, an average interterminal arrival time of the vehicle can be effectively shortened.

The functions can be implemented even through a smart phone application having a position tracking function through a GPS and the smart phone application may be installed in a smart phone and updated as necessary. Drivers can know an accurate estimated destination arrival time through a navigation function using the real-time traffic information.

In recent years, there has been a trend that entry and exit of the vehicle are more effectively managed through recognition of a license place in a lot of parking facilities and management and control of the parking facilities are automated through the management. That is, a parking lot management center determines a present parking situation to determine a utilization situation of a parking space in real time through automation of management of the parking facilities.

However, this is just management of a vehicle which has already entered the corresponding parking facility and since it is impossible to estimate the number or an estimation time of vehicles that enter the corresponding parking facility for future parking, there is a problem that parking management is not efficient.

SUMMARY OF THE INVENTION

An object of the present invention is to provide a real-time transportation network topology control-combined traffic flow control and dynamic route guidance system using an in-vehicle navigator with a bidirectional communication function, which collects positional information and traffic information of a vehicle, which are acquired from the in-vehicle navigator combined with the bidirectional communication function and provides route information to which real-time traffic information to which the collected information is reflected to the in-vehicle navigator and controls a transportation network topology by using the collected information.

Another object of the present invention is to provide a system and a method of parking guidance using a real-time transportation network topology control-combined traffic flow control and dynamic route guidance system using an in-vehicle navigator with bidirectional communication function, which can, in advance, reserve a parking space or a valet parking service of a vehicle required at a destination designated by a driver in combination with the real-time transportation network topology control-combined traffic flow control and dynamic route guidance system using an in-vehicle navigator with a bidirectional communication function which collects positional information and traffic information of a vehicle acquired from an in-vehicle navigator combined with the bidirectional communication function and provides route information to which real-time traffic information to which the collected information is reflected to the in-vehicle navigator and controls a transportation network topology by using the collected information.

Characterized configurations of the present invention for achieving the objects of the present invention and peculiar effects of the present invention are as follows.

According to an aspect of the present invention, there is provided a real-time transportation network topology control-combined traffic flow control and dynamic route guidance system using an in-vehicle navigator with bidirectional communication, the system including: a driver device receiving destination information and receiving and displaying route information for an inputted destination; a central center receiving and collecting positional information, speed information, and destination information of the vehicle from the driver device, providing the route information reflecting real-time traffic information to which the collected information is reflected to the driver device, and performing a traffic flow optimization algorithm including variation of the transportation network topology through one or more of selective variation of a road progress direction and a change in reversible lanes by using the collected information to generate transportation network topology control information; and a transportation network topology control system controlling at least one of traffic signals, road directional signals, and the number of bidirectional reversible lanes according to the transportation network topology control information received from the central center.

According to another aspect of the present invention, there is provided a parking guidance system using an in-vehicle navigator with bidirectional communication, the system including: a driver device receiving destination information and receiving and displaying route information for an inputted destination; a central center receiving and collecting positional information, speed information, and destination information of the vehicle from the driver device, providing the route information reflecting real-time traffic information to which the collected information is reflected to the driver device, and performing a traffic flow optimization algorithm including variation of the transportation network topology through one or more of selective variation of a road progress direction and a change in reversible lanes by using the collected information to generate transportation network topology control information; a transportation network topology control system controlling at least one of traffic signals, road directional signals, and the number of bidirectional reversible lanes according to the transportation network topology control information received from the central center; and a real-time parking guidance system receiving parking information from each parking lot in the real time to store the parking information in a database, receiving parking reservation for the destination from the driver device, and providing the parking information for at least one parking lot close to the destination in the parking information stored in the database to the driver device. Preferably, the system may further include a parking manager device registering parking manager information to the real-time parking guidance system and receiving parking reservation application by the real time parking guidance system to approve the parking reservation.

Preferably, the system further comprises a parking manager device registering parking manager information to the real-time parking guidance system and receiving parking reservation application by the real-time parking guidance system to approve the parking reservation.

Preferably, the driver device may be an in-vehicle navigation device installed in the vehicle.

Preferably, the driver device may be a smart phone in which an application displaying the route information and processing a function related with the parking reservation is installed.

Preferably, the parking information provided to the driver device may include one or more selected from parking lot identification information, information on the number of parking vehicles, a distance from the destination, and parking charge information.

Preferably, the real-time parking guidance system may research at least one of parking lot information by considering an estimated arrival time of the inputted destination for the vehicle.

Preferably, the real-time parking guidance system may provide calculation information for the parking charge to the parking management system of the reserved parking lot.

According to yet another aspect of the present invention, there is provided a real-time transportation network topology control-combined traffic flow control and dynamic route guidance method using an in-vehicle navigator with bidirectional communication, the method including: receiving destination information and receiving and displaying route information for an inputted destination, by a driver device; receiving and collecting positional information, speed information, and destination information of the vehicle from the driver device, providing the route information reflecting real-time traffic information to which the collected information is reflected to the driver device, and performing a traffic flow optimization algorithm including variation of the transportation network topology through one or more of selective variation of a road progress direction and a change in reversible lanes by using the collected information to generate transportation network topology control information by a central center; and controlling at least one of traffic signals, road directional signals, and the number of bidirectional reversible lanes according to the transportation network topology control information received from the central center, by a transportation network topology control system. According to still another aspect of the present invention, there is provided a parking guidance method using an in-vehicle navigator with bidirectional communication, in a parking guidance method using an in-vehicle navigator with bidirectional communication, respective steps performed by a real-time parking guidance system comprises: receiving parking information from each parking lot in the real time and storing the parking information in a database; providing destination information from a driver device; researching the parking information for at least one parking lot close to the destination in the parking information stored in the database; and transmitting the researched parking information for at least one parking lot to the driver device.

Preferably, after the transmitting of the parking information to the driver device, the method may further include receiving reservation for one parking lot selected from the driver device; applying parking reservation to a parking management device of the reserved parking lot; and receiving a reservation approval result from the parking management device.

Preferably, the driver device may be an in-vehicle navigation device installed in the vehicle.

Preferably, the driver device may be a smart phone in which an application displaying the route information and processing a function related with the parking reservation is installed.

Preferably, the parking information provided to the driver device may include one or more selected from parking lot identification information, information on the number of parking vehicles, a distance from the destination, and parking charge information.

Preferably, the real-time parking guidance system may research at least one of parking lot information by considering an estimated arrival time of the inputted destination for the vehicle.

Preferably, the real-time parking guidance system may provide calculation information for the parking charge to the parking management system of the reserved parking lot.

Meanwhile, information for performing the real-time transportation network topology control-combined traffic flow control and dynamic route guidance system using an in-vehicle navigator with bidirectional communication and the parking guidance system using an in-vehicle navigator with bidirectional communication may be stored in a server computer-readable storage medium. The storage medium may include all kinds of storage media in which programs and data are stored so as to be readable by a computer system. As an example thereof, the storage medium includes a read only memory, a random access memory, a compact disk (CD), a digital video disk (DVD)-ROM, a magnetic cape, a floppy disk, an optical data storage device, and the like, and farther, includes a storage medium implemented by a form of a carrier wave (for example, transmission through Internet). Further, the storage medium is distributed in a computer system connected through a network and may store and execute computer-readable codes by a distribution method.

According to the present invention, since real-time traffic information of a transportation network can be acquired by collecting and processing positional information and speed information of a vehicle reported to a central center through a navigator device providing bidirectional communication, the real-time traffic information may not depending on a separate real-time traffic information collection and distribution system in the related art to save an expense required for initial investment and maintenance therefor.

Further, a capacity of a given transportation network can be maximally used by simultaneously calculating a structure (a progress direction of a reversible lane or a road) of each road so that an average inter-terminal driving time of all vehicles is minimized with respect to the capacity of the given transportation network and traffic congestion can be reduced by maximizing a substantial capacity of the transportation network without extension of a separate transportation network through the capacity.

Moreover, according to the present invention, a parking space or a valet parking service of a vehicle required at a corresponding destination can be, in advance, reserved by using destination information and real-time traffic information designated by a driver through an in-vehicle navigator function combined with a bidirectional communication function and the resulting effects will be described below.

First, drivers secure a legal valid space to park the vehicle at destinations thereof in advance to prevent illegal parking in advance.

Second, the drivers can receive routes up to a corresponding position in order to find where to park the vehicle at the destinations thereof and reserve the parking space or the valet parking service in advance as necessary. That is, since an arrival time of the vehicle is known in advance, parking is enabled simultaneously with arrival to provide convenience to a user.

Third, the drivers recognize an inexpensive parking space in advance to provide the inexpensive parking space by guiding the vehicle to a corresponding parking lot and the vehicles are guided to public and private parking lots to minimize vacancy rate of the parking lot.

Fourth, a parking space insufficiency problem of a specific business place can be efficiently solved through information sharing and space sharing among the parking lots.

Fifth, drivers that first use the specific business place intend to recognize a possibility to park vehicles thereof in a corresponding business establishment or therearound and since existence of the information can exert a direct influence on a business, business places in which the corresponding information is registered in advance can help attracting customers. For example, when a lot of drivers intend to use a specific restaurant, the drivers first verify whether to park the vehicles thereof.

In this case, a customer service is maximized by registering a business owner registers associated information in a corresponding business establishment online in advance and providing a parking guidance service in advance to contribute to business activation. Further, since all business owners will intend to volunteer to register enterprises thereof in this system in order to expose the enterprises thereof online, a database required in the system according to an embodiment of the present invention can be naturally constructed and updated without a separate effort.

Sixth, individual parking spaces can be shared to solve the parking space insufficiency problem of a downtown. For example, in a primary building of the downtown, a parking lot which is vacant after leaving an office may be shared for neighboring business establishments by leading cars to the parking lot.

Seventh, a destination to satisfy an optimal condition is and guided through providing the route by analyzing both information provided by a business operator and an input condition of the driver to satisfy mutual appreciation between the business operator and the use. For example, an optimal refueling time and inexpensive gas station may be recommended by analyzing an oil price and current remaining gas provided by the business operator in the case of the gas station.

DETAILED DESCRIPTION OF THE PREFERRED EMBODIMENTS

Figure 1:
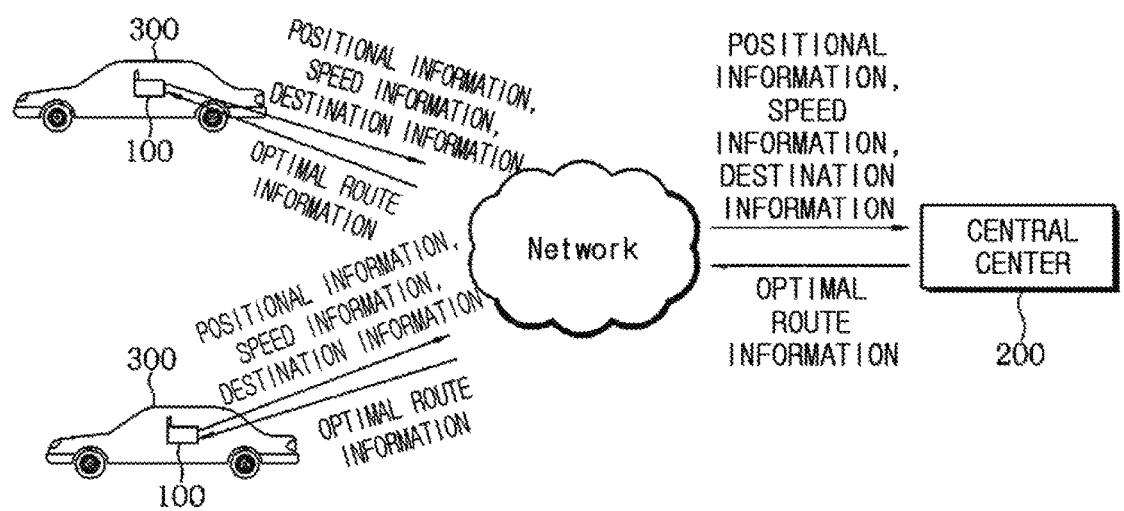
FIG. 1 is a configuration diagram of a real-time traffic flow control and dynamic route guidance system using an in-vehicle navigator with bidirectional communication.

Embodiments of the present invention will be described in detail with reference to the accompanying drawings. These embodiments will be described in detail for those skilled in the art in order to practice the present invention. It should be appreciated that various embodiments of the present invention are different but do not have to be exclusive. For example, specific shapes, configurations, and characteristics described in an embodiment of the present invention may be implemented in another embodiment without departing from the spirit and the scope of the present invention. In addition, it should be understood that position and arrangement of individual components in each disclosed embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings.

The present invention provides a real-time transportation network topology control-combined traffic flow control and dynamic route guidance system using an in-vehicle navigator with bidirectional communication and a parking guidance system using the same.

Accordingly, according to an exemplary embodiment of the present invention, when a driver inputs destination information (for example, a telephone number, business name, building name, an address, a predetermined code, or the like) to an in-vehicle navigator, the real-time transportation network topology control-combined traffic flow control and dynamic route guidance is possible by using real-time traffic information and the like based on the inputted destination information, and further, information on an estimated destination arrival time of the driver may be determined. In this case, according to the exemplary embodiment of the present invention, parking information considering the destination and the estimated destination arrival time of the driver is provided to the driver, and the driver selects a specific parking space to perform parking reservation. Further, the parking reservation information is provided to a terminal of a parking manager to provide efficient and planned parking management.

Meanwhile, after the parking reservation, when a traffic situation varies during driving and the estimated arrival time is changed, the estimated arrival time may be continuously updated to ensure an accurate estimated arrival time.

Further, according to the exemplary embodiment of the present invention, at least one parking space may be verified and notified according to a parking space or a distance order of a parking lot which is closest to the destination at a corresponding time, by using information on the estimated time at which the driver reaches the destination. Further, according to another exemplary embodiment of the present invention, at least one parking space may also be verified and notified according to an order in which prices are lower among the parking spaces within a predetermined distance. In this case, since an estimated time at which the vehicle reaches the destination and a free parking space may be continuously changed, optimal allocation is possible by using a correlation of these information.

Further, according to the exemplary embodiment of the present invention, in the case where a final destination of the driver is a specific company (for example, a restaurant), a parking space for a customer may be secured in advance or when the corresponding customer arrives may be notified to the corresponding company in advance in a situation where the vehicle is left to a parking management attendant on arrival. In this case, information for guiding the corresponding vehicle to a parking lot therearound is provided and the corresponding route may be notified through the navigator of the driver. Accordingly, the customer inputs the destination information to determine a situation (estimated arrival time) of a vehicle to arrive at a specific workplace to ensure the parking space in advance or use the staffing displacement of the parking management person.

Meanwhile, in order to provide the parking reservation and guidance system to the driver, a destination input interface and a route guidance screen may be provided to the navigator with bidirectional communication or the driver downloads and installs an application which provides the function to a driver's smart phone to use the system. In this case, before providing the service according to the exemplary embodiment of the present invention, a vehicle number, other vehicle-related information, and the like may be registered through the system according to the present invention. Further, a user which is responsible for the parking of the vehicle at the destination may install and manage the corresponding application in a user's management system or a smart phone.

Further, according to the exemplary embodiment of the present invention, the user which is responsible for the parking of the vehicle at the destination may pre-register parking positional information and parking identification number/company identification number (a telephone number, an address, a unique allocation code, and the like) in the system according to the present invention, and when the drivers input the identification numbers, the corresponding parking lot (company) may determine when the corresponding vehicle arrives at the destination by the pre-registered vehicle information (a vehicle number, a vehicle model, and the like).

Further, by the system according to the exemplary embodiment of the present invention, a service of guiding the vehicle to a specific destination may be provided, and a calculation system may be provided so that a parking owner or a business owner pays a service charge by a guided vehicle unit.

Further, according to the exemplary embodiment of the present invention, a specific person inputs related information to the system so as to guide other people to use a own parking space for a predetermined time, and the driver uses the information depending on the driver's selection to pre-reserve the parking space.

Further, the driver inputs a specific destination to automatically determine the final destination, but according to another exemplary embodiment of the present invention, when the driver inputs specific industries and conditions of a specific area, the destinations determined by analyzing the input conditions and traffic information are displayed on the screen, and the driver may finally select the destination.

In this case, information that the driver needs may be additionally provided according to a business type as a selection condition, and the additionally provided information may be directly updated by the owner in the system according to the present invention in real time. As a result, the driver may be guided to the corresponding destination through the navigator with respect to the selected destination in the manner proposed in the exemplary embodiment of the present invention.

Hereinafter, preferred embodiments of the present invention will be described in detail with reference to the accompanying drawings so that those skilled in the art may easily practice the present invention.

First, a concept of the traffic flow control and dynamic route guidance system using the navigator with bidirectional communication applied to the present invention will be described with reference to FIGS. 1 to 3.

FIG. 1 is a configuration flowchart for a real-time transportation network topology control-combined traffic flow control and dynamic route guidance system using an in-vehicle navigator with bidirectional communication, and the system may be configured by a central center 200 connected with a navigator 100 installed in a plurality of vehicles 300 through a network. In this case, the network may include a wireless communication network such as 3G, Wibro, Mobile Wimax, and LTE.

Meanwhile, the navigator 100 periodically packets destination information generated by receiving the destination from the user through a display including a touch screen, current positional information generated through a GPS receiver, and speed information calculated by using the positional information through the network to transmit the information to the central center 200, and the central center 200 may extract and store the destination information, the positional information, and the speed information from the packet received through the network.

Figure 2:
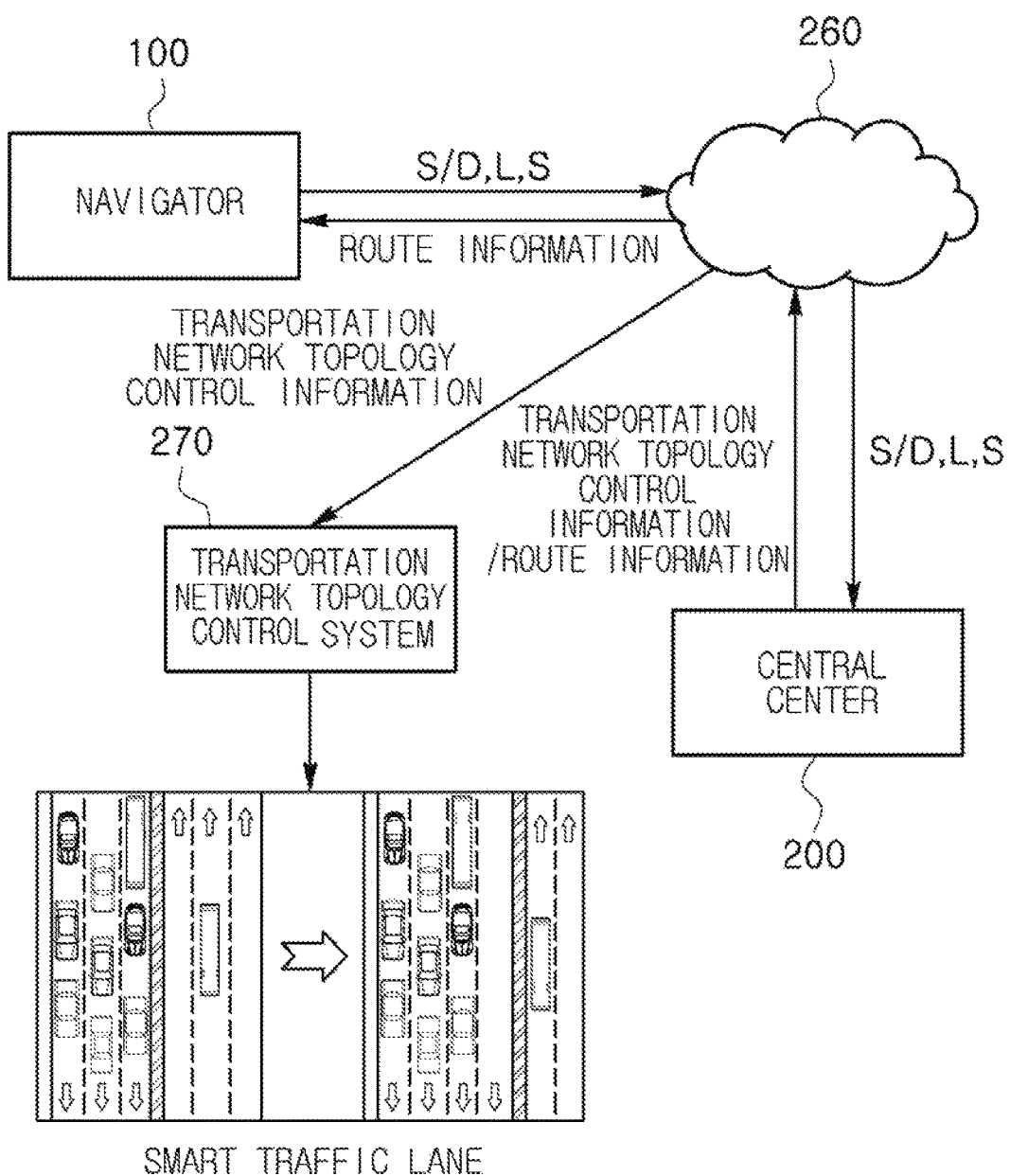
FIG. 2 is a diagram illustrating a concept of the traffic flow control and dynamic route guidance system using the navigator with bidirectional communication which is applied to the present invention.
Figure 3:
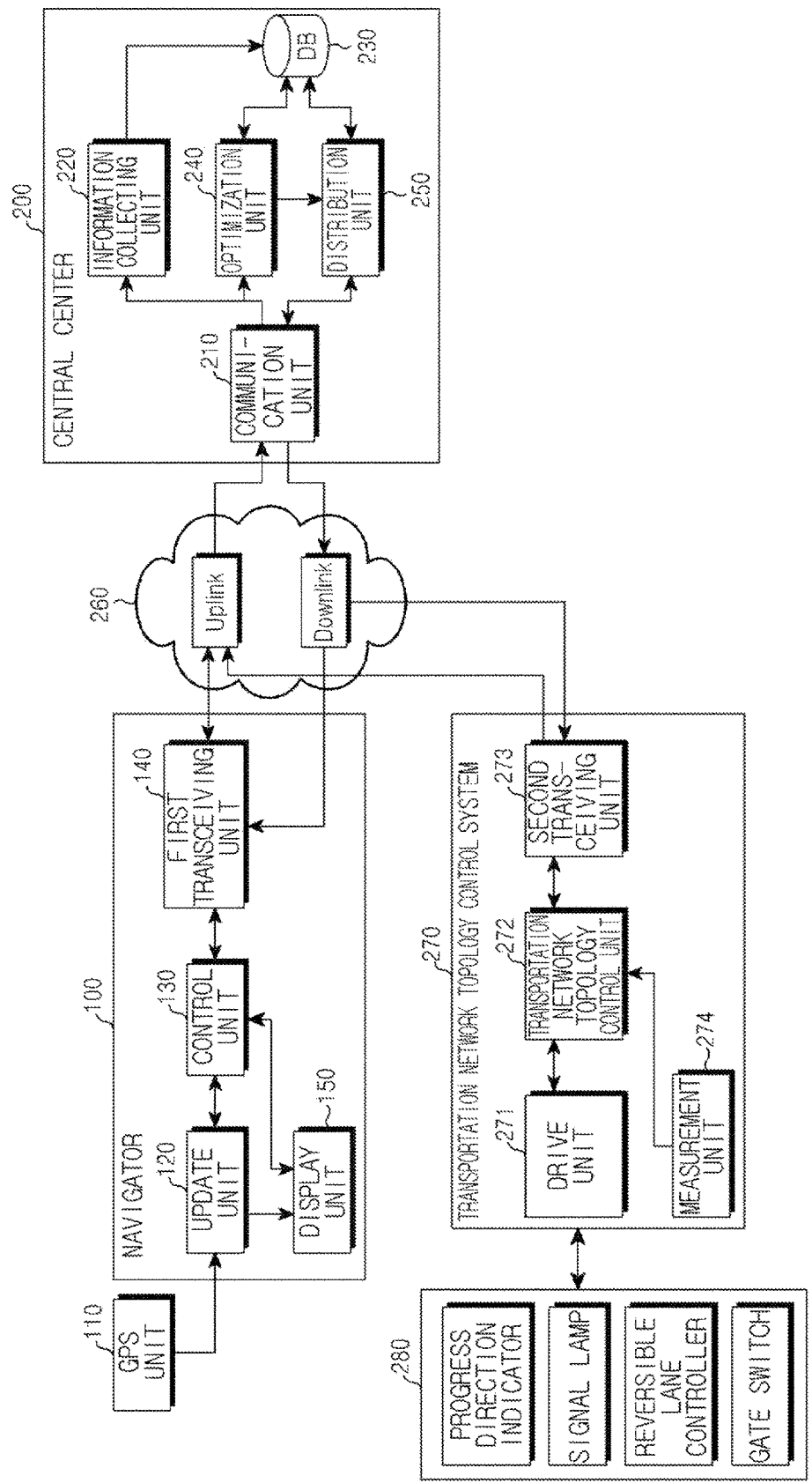
FIG. 3 is a diagram illustrating a detailed configuration diagram for implementing the concept of FIG. 2.

FIG. 2 is a diagram illustrating a concept of the traffic flow control and dynamic route guidance system using the navigator with bidirectional communication which is applied to the present invention, and FIG. 3 is a diagram illustrating a detailed configuration diagram for implementing the concept of FIG. 2.

Referring to FIG. 2, the navigator 100 applied to the present invention may transmit and receive information by bi-directionally communicating with one or more devices for traffic flow control and dynamic route guidance. For example, the navigator 100 acquires positional information L of the vehicle through a GPS satellites and transmits starting point/destination (S/D) information and vehicle speed (B) information which are input by the user in addition to the acquired positional information to the central center 200 or a transportation network topology control system 270, and the central center provides transportation network information and information on an optimal route to the destination to the navigator.

Meanwhile, the central center 200 integrates the positional information of the vehicle, the speed information, and the destination information which are collected from each navigator to analyze the volume of traffic, controls a reversible lane through a topology and flow optimization, or generate transportation network topology control information for controlling road progress directions, traffic signals, and the like to transmit the information to the transportation network topology control system 270. Thereafter, the transportation network topology control system 270 controls at least one of traffic signals, road direction signals, and the number of bidirectional reversible lanes according to the received transportation network topology control information. Further, the central center transmits route information for each navigator so that the volume of traffic is distributed according to the analysis of the volume of traffic.

Referring to FIG. 3, the navigation device may be configured by a GPS unit 110, an update unit 120, a control unit 130, a first transceiving unit 140, and a display unit 150, and the GPS unit 110 transfers the positional information received through the GPS communication, the update unit 120 updates the current location according to vehicle movement in the real time based on the positional information transmitted by the GPS unit 110 to display the updated current location on the display unit 150 and transmit the positional information to the control unit 130 at the same time.

The control unit 130 calculates the speed based on the positional information to generate the speed information and transfers the speed information and the positional information to the first transceiving unit 140 to transmit the transferred speed information and positional information to a communication unit 210 of the central center 200 through a communication network 260. Further, the control unit 130 may receive the destination information which is received through the touch input of the user to the display unit 150 to transmit the destination information to the communication unit 210 of the central center through the first transceiving unit 140 in addition to the speed information and the positional information.

The central center 200 generates optimal route information based on the positional information, the speed information, and the destination information, which are received through the communication unit 210 as illustrated in FIG. 1 and transmits the optimal route information to the first transceiving unit 140 through the communication network 260.

The control unit 130 transfers the optimal route information received through the first transceiving unit 140 to the update unit 120, and the update unit 120 displays the optimal route information on the display unit 150 to provide the optimal route information according to the positional information of the user, the speed information, and the destination information.

The communication network 260 may be configured regardless of communication modes such as wired and wireless modes and may be configured by various communication networks such as a personal area network (PAN), a local area network (LAN), a metropolitan area network (MAN), and a wide area network (WAN). Further, the communication network 260 may be a known world wide web (WWW), and may also use wireless transmission techniques used in personal communication such as infrared data association (IrDA) or Bluetooth.

Meanwhile, the control unit 130 receives the optimal route information and then may periodically transmit the positional information to the central center 200 while the vehicle moves on the route and transmit changed destination information to the central center 200 when the destination is chanced. As a result, in the case where the control unit 130 monitors that the vehicle travels by deviating from the optimized route and traffic congestion occurs in a specific unit route on the optimal route information when the destination is changed and after the optimal route information is transmitted, an optimization unit 240 of the central center 200 provides the optimal route information updated for the vehicle to update the optimal route information so that the vehicle may efficiently travel up to the destination.

That is, the optimization unit 240 of the central center 200 dynamically performs the traffic flow optimization algorism using the received destination information and the real-time traffic information to ensure efficiency of the entire transportation network.

Further, so as to minimize an average travel time between ends of the vehicle by determining the flow of all vehicles through real-time communication between the navigation device 100 and the central center 200 to distribute the vehicles, as described above, the central center provides the optimal route information and controls the transportation network topology control system including the reversible lane control device, the signal lamp, and the gate control device which are installed on the roads through the transportation network topology control information to provide the optimal route information for each vehicle while dynamically controlling the topology of the transportation network (the number of bidirectional reversible lanes, opening and closing of the inlet and the outlet, and progress direction of the road).

To this end, the transportation network topology control system 270 receives the transportation network topology control information from the central center 200 to control a traffic controller 280 such as a progress direction indicator, a signal lamp, a reversible lane controller, and a gate switch.

The transportation network topology control system 270 may include a second transceiving unit 273 receiving the transportation network topology control information, a drive unit 271 controlling the traffic controller 280 so as to change the progress direction of the road, change the signal, control the number of reversible lanes, or open and close the inlet and the outlet, a measurement unit 274 measuring current traffic flow or the traffic volume, and a transportation network topology controller 272 controlling the traffic controller 280 through the drive unit 271 based on the transportation network topology control information received through the second transceiving unit 273 to change the topology of the transportation network and transmitting information on the traffic flow or the traffic volume which is measured by the measurement unit 274 to the central center 200 through the second transceiving unit 273.

In this case, the transportation network topology controller 272 may recognize a current state of the drive unit 271 to transmit driving information regarding the progress direction, the signal, the number of lanes, a state of the opened and closed gate, and the like which are currently displayed by the traffic controller 280 to the central center through the second transceiving unit 273. As a result, the central center 200 may identify the current transportation network topology.

Meanwhile, as described above, even in the case where the vehicle deviates from the optimal route provided from the central center through the real-time communication between the navigation device 100 and the central center 200 or destination information input to the navigation device is different from the destination information when the optimal route information is generated, the real-time transportation management system according to the present invention may actively cope with a route movement state of the vehicle and destination information which are actively variable by updating the optimal route information.

Hereinafter, the system and the device according to the exemplary embodiment of the present invention will be described with reference to FIGS. 4 and 5.

Figure 4:
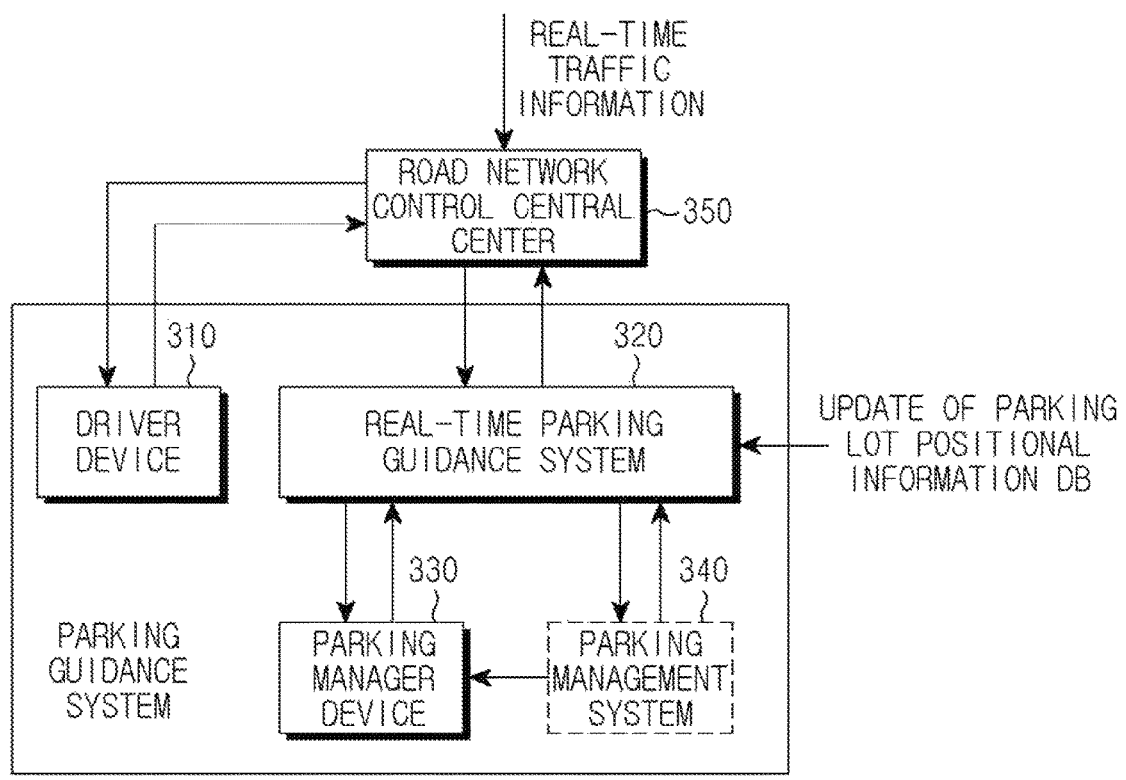
FIG. 4 is a diagram illustrating a structure of a parking guidance system according to an exemplary embodiment of the present invention.

FIG. 4 is a diagram illustrating a structure of a parking guidance system according to an exemplary embodiment of the present invention. Referring to FIG. 4, the parking guidance system according to the exemplary embodiment of the present invention may include a driver device 310, a real-time parking guidance system 320, a parking manager device 330, a parking management system 340, and the like. Further, the parking guidance system according to the exemplary embodiment of the present invention may be configured in association with a road network control central center 350.

The driver device 310 may be an in-vehicle navigation device installed in the vehicle and may also be a smart phone of the driver riding in the vehicle. When the driver inputs the destination in the driver device 310, input destination information and a vehicle identification number are transmitted to the road network control central center 350. The road network control central center 350 determines an optimal route for each destination with respect to each vehicle based on the destination information for each vehicle and the collected real-time traffic information to provide the optimal information to each driver device 310.

The driver device 310, as a concept including a general navigation device and a smart phone, includes a memory means such as a mobile terminal, a desktop computer, a laptop computer, a workstation, a palmtop computer, a personal digital assistant (PDA), and a web pad, and any digital devices with operation ability which is equipped with a microprocessor may be selected as the driver device 310 according to the present invention.

Meanwhile, according to the exemplary embodiment of the present invention, when a parking reservation service is provided from the driver device 310, the road network control central center 350 provides estimated arrival time information of the destination set for each vehicle and identification information of the corresponding vehicle to the real-time parking guidance system 320. In this case, the estimated arrival time information of the destination set for each vehicle and the identification information of the corresponding vehicle may be immediately transmitted from the driver device 310 to the real-time parking guidance system 320.

Meanwhile, the real-time parking guidance system 320 receives and collects information on each parking lot (for example, parking positional information, a parking charge, and the number of parking vehicles) in advance. Further, the real-time parking guidance system 320 receives parking lot information (for example, information on the number of parking vehicles and the like) in the real time from the parking management system 340 installed at each parking lot. In this case, the registered positional information of each parking lot is stored in a database, and new positional information is, for example, periodically updated and stored.

Accordingly, the real-time parking guidance system 320 researches a parking lot installed at the destination or information on a parking lot close to the destination from the database based on the destination information and the estimated arrival time information which are provided from each driver device 310. Next, the researched parking lot information may be provided to the driver device 310 through the road network control central center 350 or directly provided to the driver device 310.

The driver device 310 receives at least one parking lot information from the real-time parking guidance system 320 and applies parking reservation for a specific parking lot. The parking reservation information is provided to the real-time parking guidance system 320, and the real-time parking guidance system 320 provides the parking reservation information for the corresponding vehicle to the parking manager device 330 of the corresponding parking lot (for example, a terminal or a smart phone of the parking manager). In this case, the information provided to the parking manager device 330 may include an identification number of the parking manager, the time based number of arrived vehicles, an estimated arrival time of each vehicle, a vehicle identification number, and the like. As a result, the parking manager device 330 verifies the information provided through the real-time parking guidance system 320 to establish a parking plan in advance. For example, since when the corresponding vehicle arrives at the parking lot may be determined, staffing displacement of the parking management person may be planed in advance. When a charge is paid depending on the parking, parking charge calculation information may be provided from the real-time parking guidance system 320 to the parking management system 340.

Figure 5:
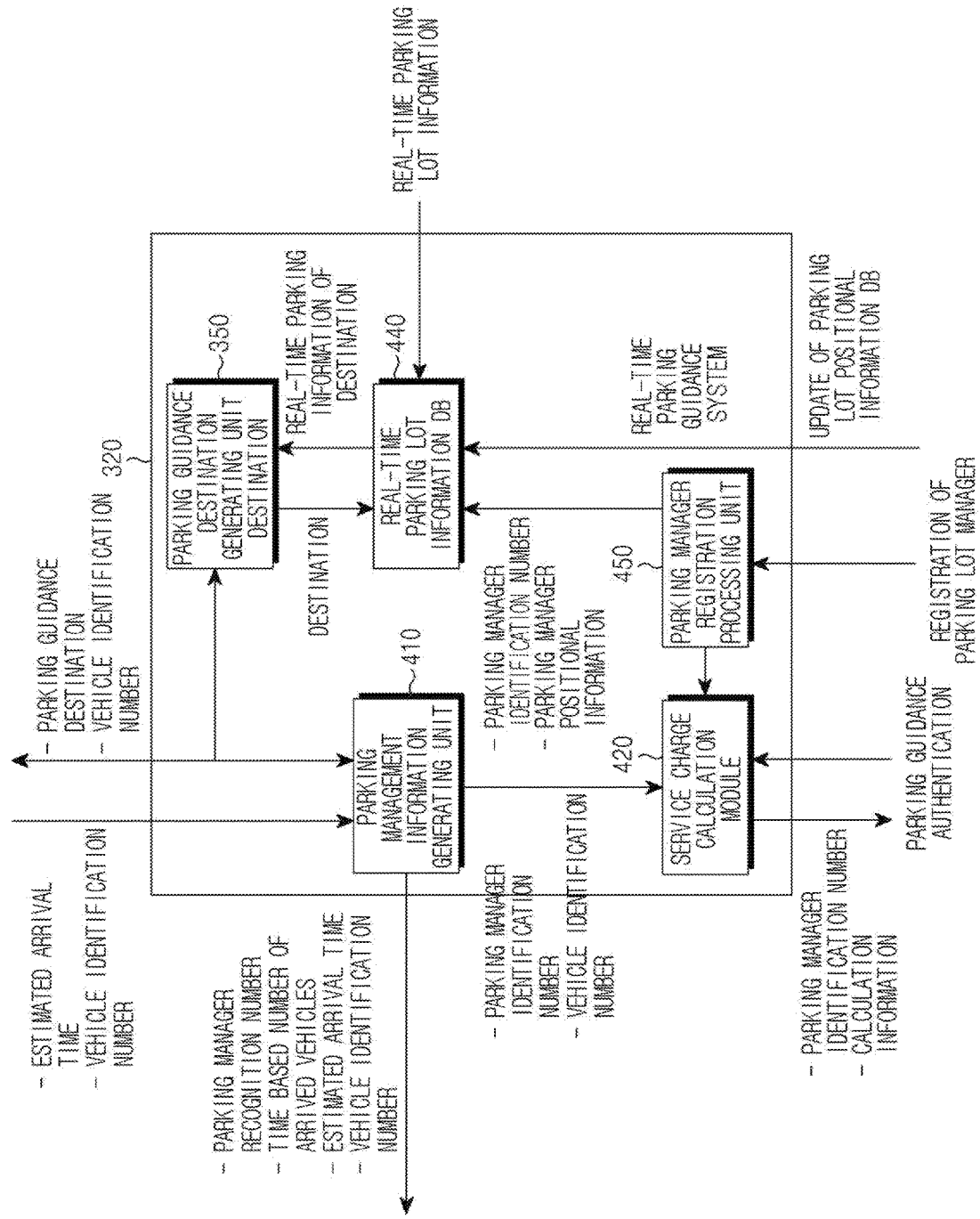
FIG. 5 is a block diagram illustrating a detailed configuration of a real-time parking guidance system according to the exemplary embodiment of the present invention.

FIG. 5 is a block diagram illustrating a detailed configuration of a real-time parking guidance system according to the exemplary embodiment of the present invention. Referring to FIG. 5, the real-time parking guidance system 320 of FIG. 3 may include a parking management information generating unit 410, a service charge calculation module 420, a parking guidance destination generating unit 430, a real-time parking lot information database 440, a parking manager registration processing unit 450, and the like.

The parking management information generating unit 410 receives the vehicle identification information of the corresponding vehicle and the destination estimated arrival time directly from the driver device 310 or through the road network, control central center 350. In this case, when the parking reservation for the corresponding vehicle is determined, the parking reservation information including the destination information for parking guidance and the vehicle identification information of the corresponding vehicle is provided to the driver device 310 through the road network control central center 350.

Further, the parking management information generating unit 410 provides the information regarding a parking manager identification number, the time based number of arrived vehicles, an estimated arrival time, a vehicle identification number, and the like, to the parking manager device 330 with respect to the parking reserved vehicle.

Further, the parking management information generating unit 410 provides the parking manager identification number and the vehicle identification number for the reserved parking to the service charge calculation module 420. The service charge calculation module 420 calculates the service charge for the corresponding parking lot to transmit calculation information to the parking management system 340 of the corresponding parking lot.

Meanwhile, the real-time parking guidance system 320 receives real-time parking lot information from the parking management system 340 of each parking lot to store the real-time parking lot information in the real-time parking lot information database 440. The real-time parking lot information database 440 may be updated according to a request for updating the parking positional information.

The parking guidance destination generating unit 430 researches the real-time parking lot information database 440 as the destination information of the corresponding vehicle according to a parking reservation request of each driver device 310. Next, the real-time parking information for at least one parking lot which is close to the destination is researched from the real-time parking lot information database 440 to be provided to each driver device 410.

The parking manager registration processing unit 450 receives parking manager registration information from the parking manager device 330 and stores identification information of the corresponding parking manager and positional information of the parking manager to in the real-time parking lot information database 440. In this case, the service charge calculation module 420 performs a calculation process for the corresponding parking lot with reference to the parking manager information registered through the parking manager registration processing unit 450.

Meanwhile, respective components of the real-time parking guidance system 320 are separately displayed in the drawings in order to represent that the components may be functionally and logically separated and do not particularly physically mean separate components or that the components are implemented by a separate code.

In addition, in the specification, each function unit (alternatively, module) may mean a functional and structural combination of hardware for executing the technical spirit of the present invention and software for driving the hardware. For example, each function unit may mean a logic unit of a predetermined code and a hardware resource for executing the predetermined code and it may be easily deduced by those skilled in the art that each function unit does not particularly mean a physically connected code or one kind of hardware.

Further, the database in the specification may mean a functional and structural combination of software and hardware storing information corresponding to respective databases. The database includes all data storage media and data structures capable of storing the information corresponding to the database.

Hereinabove, the system and the device according to the exemplary embodiment of the present invention are described with reference to FIGS. 4 and 5. Hereinafter, a parking guidance service procedure according to the exemplary embodiment of the present invention will be described with reference to FIG. 8.

Figure 8:
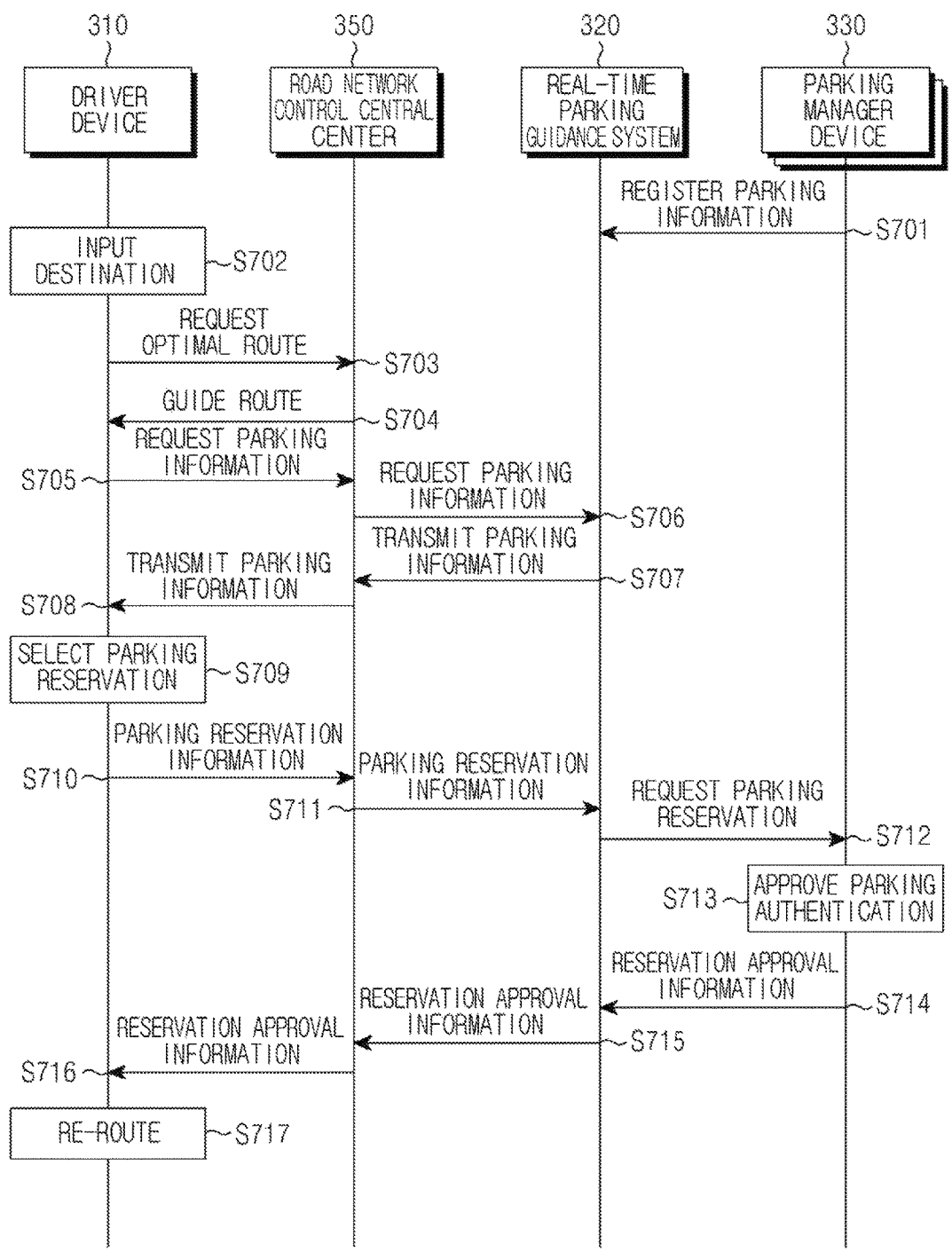
FIG. 8 is a signal flowchart illustrating a parking guidance method using the in-vehicle navigator with bidirectional communication according to the exemplary embodiment of the present invention.

FIG. 8 is a signal flowchart illustrating a parking guidance method using the in-vehicle navigator with bidirectional communication according to the exemplary embodiment of the present invention.

Referring to FIG. 8, when the driver device 310 (for example, an in-vehicle navigation device, a smart phone of the vehicle driver, or the like) inputs the destination (S702), according to the exemplary embodiment of the present invention, the optimal route is requested to the road network control central center 350 by bidirectional communication of the driver device 310. The road network control central center 350 may provide optimal route information to the corresponding destination to each driver device 310 by considering the destination information collected from each driver device 310 and the real-time traffic information.

Meanwhile, according to the exemplary embodiment of the present invention, when the driver device 310 performs the parking reservation for the corresponding destination, the driver device 310 may request the parking information through the road network control central center 350 or directly to the real-time parking guidance system 320 (S705). For example, when the parking information is requested to the road network control central center 350, the road network control central center 350 requests the parking information to the real-time parking guidance system 320 (S706). The real-time parking guidance system 320 receives the parking information from each parking manager device 330 or the parking management system 340 to register the parking information in the database (S701) and updates the information in the real time. In this case, in the real-time parking guidance system 320, the parking information received from each parking manager device 330 or the parking management system 340 may include the positional information of the parking lot, information on the number of real-time parking vehicles, and the like as described above.

According to the parking information request through the road network control central center 350, the real-time parking guidance system 320 verifies the collected parking information of each parking lot and transmits the parking information for the parking lot corresponding to the destination of each vehicle or the parking lot close to the destination of each vehicle through the road network control central center 350 or directly to the driver device 310 (S707 and S708).

Meanwhile, the driver device 310 displays the transmitted parking information on the screen as illustrated in FIG. 5. As a result, the driver verifies at least one of parking lot information displayed on the driver device 310 and selects a specific parking lot to apply parking reservation for the selected parking lot (S709).

According to the parking reservation application, the parking reservation information is transmitted through the road network control central center 350 or directly to the real-time parking guidance system 320 (S710 and S711). The real-time parking guidance system 320 transmits parking reservation request information to the parking manager device 330 or the parking management system 340 of the corresponding reserved parking lot (S712).

When the parking manager device 330 or the parking management system 340 approves the parking reservation according to the parking reservation request (S713), reservation approval information is transmitted to the real-time parking guidance system 320 to be reserved. Further, the reservation approval information is transmitted through the road network control central center 350 or directly to the driver device 310 (S715 and S716).

Figure 6:
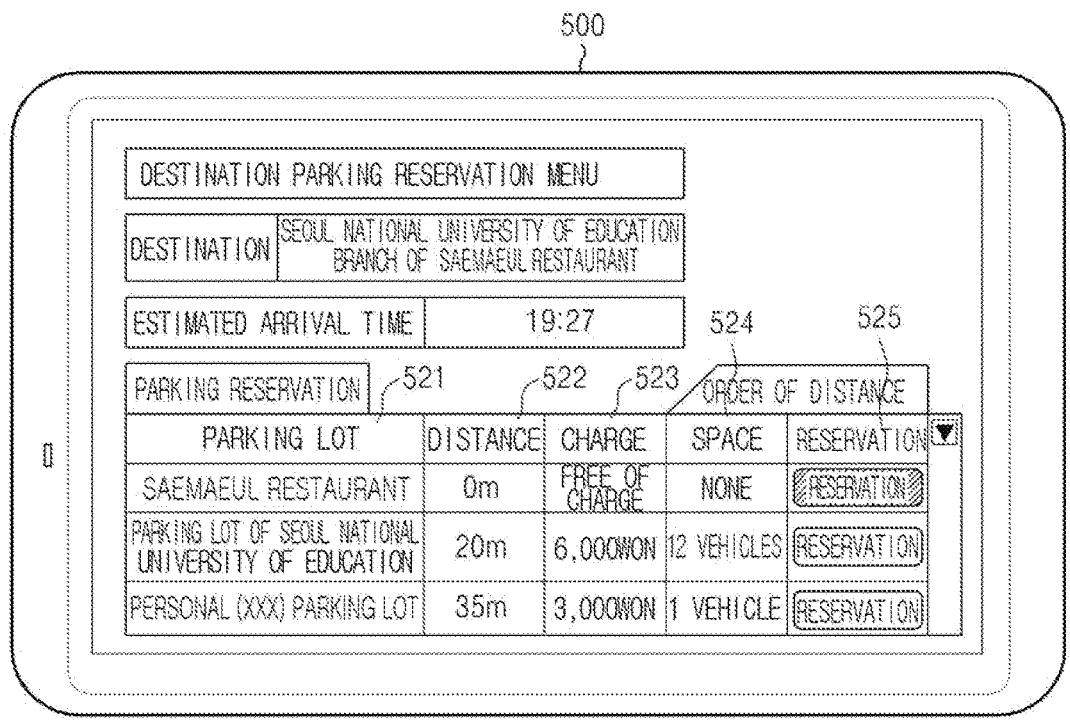
FIG. 6 is a diagram illustrating a parking reservation screen in the navigation according to the exemplary embodiment of the present invention.

In this case, the driver device 310 resets the route from an initial set destination to the position of the reserved parking lot as illustrated in FIG. 6 (S717).

Meanwhile, the method according to the present invention is implemented in a form of program commands which can he executed through various computer means to thereby be recorded in a computer-readable recording medium. The computer-readable recording medium may include a program command, a data file, a data structure or the like, alone or a combination thereof. The program command recorded in the computer-readable recording medium may be especially designed and constituted for the present invention or be known to those skilled in a field of computer software. Examples of the computer-readable recording medium may include a magnetic medium such as a hard disk, a floppy disk, or a magnetic tape; an optical recording medium such as a compact disk read only memory (CD-ROM) , or a digital versatile disk (DVD); a magneto-optical medium such as a floptical disk; and a hardware device specially constituted to store and perform program commands, such as a ROM, a random access memory (RAM), a flash memory, or the like. Examples of the program commands may include a high-level language code capable of being executed by a computer using an interpreter, or the like, as well as a machine language code made by a compiler. The hardware device may be constituted to be operated as at least one software module in order to perform an operation according to the present invention, and vice versa.

FIG. 6 is a diagram illustrating a parking reservation screen in the navigation according to the exemplary embodiment of the present invention. Referring to FIG. 6, when the driver device 310 (for example, an in-vehicle navigation device) selects the destination and applies the parking reservation, a destination parking reservation menu may be provided from the screen 500. For example, a destination 510 selected by the driver and an estimated, arrival time 520 may be displayed, and at least one of parking information positioned around the destination 510 may be provided.

In this case, the parking information may be displayed in the order close to the destination, and the parking information positioned within a predetermined distance from the destination may be displayed in a charge order.

In FIG. 6, the parking information may be displayed in the order close to the destination, and a distance 522 from the destination for each parking lot 521, a charge 523, and the number of parking vehicles 524 may be displayed. For example, when the diver selects 'Saemaeul restaurant at Seoul National University of Education' as the destination, a parking lot of the Saemaeul restaurant which is a parking lot of the destination may be displayed at the uppermost end. In the 'parking lot of the Saemaeul restaurant', the distance from the destination is '0 m' and the charge is free in the case of using the restaurant. However, since the number of parking vehicles is '0', a reservation button 525 may not be activated.

Next, the parking lot at the closest position is a 'parking lot of the Seoul national university of Education', the distance from the destination is 20 m, the charge is 6,000 won, and 12 vehicles may be parked. Accordingly, the driver presses the reservation button 525 of the corresponding parking lot to apply the reservation for the corresponding parking lot. In this case, the reservation application information is transmitted to the parking management system 340 or the parking manager device 330 of the parking lot according to the exemplary embodiment of the present invention.

Next, the parking lot at the close position is a 'personal (XXX) parking lot', the distance from the destination is 35 m, the charge is 3,000 won, and 1 vehicle may be parked. Meanwhile, at the personal parking lot, since the distance from the destination is increased, but the charge is cheaper, the driver may select a specific parking lot by considering the distance or the price at the same time. As such, according to the exemplary embodiment of the present invention, a parking lot of a specific company (for example, restaurants), a public parking lot, a private parking lot, a personal parking lot, and the like may be registered in the system of the present invention, and the user may select and reserve a desired parking lot among the registered parking lots.

Figure 7:
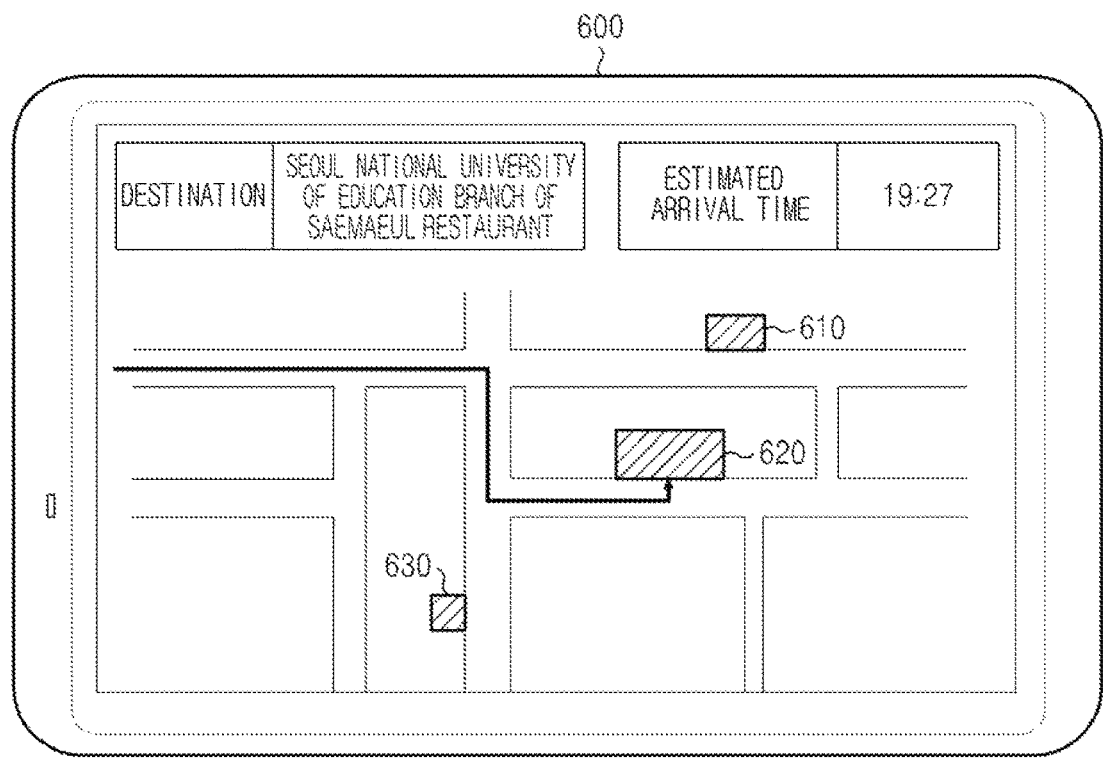
FIG. 7 is a diagram illustrating route guidance to a reserved parking lot in the navigation according to the exemplary embodiment of the present invention.

FIG. 7 is a diagram, illustrating route guidance to a reserved parking lot in the navigation according to the exemplary embodiment of the present invention. That is, in FIG. 6, when the parking lot of the Seoul National University of Education is reserved, as illustrated in FIG. 7, a route set to a 'Saemaeul restaurant at Seoul National University of Education' 610 on an electronic map 600 is changed and displayed to the parking lot of the Seoul National University of Education 620. Further, a usable personal parking lot 630 may also be displayed on the map together.

The present invention has been described above with a purpose of method steps representing specific functions and performance of relationships thereof. Boundaries and the sequence of the functional components and the method steps are arbitrarily defined herein for easy description. If the specific functions and relationships are appropriately performed, alternative boundaries and sequences may be defined. The predetermined alternative boundaries and sequences are therefore within the scope and the spirit of the claimed invention. Additionally, the boundaries of the functional components are arbitrarily defined for easy description. If any primary functions are appropriately performed, the alternative boundaries may be defined. Similarly, blocks of the flowchart may also be arbitrarily defined herein in order to exhibit any primary functionality. For extended use, boundaries and sequences of the blocks of the flowchart may be defined and still perform any primary function. The alternative definitions of both the functional components and the flowchart blocks and the sequences are therefore within the scope and the spirit of the claimed present invention.

The present invention may also be at least partially described as terms of one or more embodiments. The embodiment of the present invention is used herein in order to represent the present invention, the aspect, the feature, the concept, and/or the example. A physical embodiment of a device, a manufactured object, a machine, and/or a process that implement the present invention may include one or more aspects, features, concepts, examples, and the like described with reference one or more embodiments described herein. Moreover, in all drawings, the embodiments may integrate the same or similarly named functions, steps, modules, and the like which may use the same or different reference numerals and as described above, the functions, steps, modules, and the like may be the same or similar functions, steps, modules, and the like or others.

Hereinabove, although the present invention has been described by specific matters such as detailed components, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the sprit of the present invention should not be limited to the above-described embodiments and the following claims as well as ail modified equally or equivalently to the claims are intended to fall within the scopes and spirits of the invention.

What is claimed is:

1. A destination-aware vehicle guidance system using an in-vehicle navigator with bidirectional communication, the system comprising:
   a driver device receiving destination information and receiving and displaying route for an inputted destination information;
   a central unit receiving and collecting positional information, speed information, and destination information of the vehicle from the driver device, providing the route information reflecting real-time traffic information to which the collected information is reflected to the driver device, and performing a traffic flow optimization algorithm including variation of the transportation network topology through one or more of selective variation of a road progress direction and a change in reversible lanes by using the collected information to generate transportation network topology control information;
   a transportation network topology control system controlling at least one of traffic signals, road directional signals, and the number of bidirectional reversible lanes according to the transportation network topology control information received from the central unit; and
   a real-time destination-aware vehicle guidance system receiving parking information from each parking lot in the real time to store the parking information in a database, receiving parking reservation for the destination from the driver device, and providing the parking information for at least one parking lot close to the destination in the parking information stored in the database to the driver device.

2. The system of claim 1, further comprising:
   a destination-aware vehicle locator device registering parking manager information to the real-time destination-aware vehicle guidance system and receiving parking reservation application by the real-time destination-aware vehicle guidance system to approve the parking reservation.

3. The system of claim 1, wherein the driver device is an in-vehicle navigation device installed in the vehicle.

4. The system of claim 1, wherein the driver device is a smart phone in which an application displaying the route information and processing a function related with the parking reservation is installed.

5. The system of claim 1, wherein the parking information provided to the driver device includes one or more selected from parking lot identification information, information on the number of parking vehicles, a distance from the destination, and parking change information.

6. The system of claim 1, wherein the real-time destination-aware vehicle guidance system researches at least one of parking lot information by considering an estimated arrival time of the inputted destination for the vehicle.

7. The system of claim 1, wherein the real-time destination-aware vehicle guidance system provides calculation information for the parking charge to the parking management system of the reserved parking lot.

8. The system of claim 2, wherein, when the inputted destination information is a specific company, the destination-aware vehicle locator device provides current location of the vehicle, estimated arrival time of the vehicle, based on the received parking reservation application.

9. The system of claim 2, wherein the real-time destination-aware vehicle guidance system notifies the destination-aware vehicle locator device of the inputted destination of an estimated arrival time of the vehicle.

* * * * *